US005294475A

United States Patent [19]

McNeil

[11] Patent Number: 5,294,475

[45] Date of Patent: Mar. 15, 1994

[54] DUAL PLY CELLULOSIC FIBROUS STRUCTURE LAMINATE

[75] Inventor: Kevin B. McNeil, Maineville, Ohio

[73] Assignee: The Procter & Gamble Company, Cincinnati, Ohio

[21] Appl. No.: 898,041

[22] Filed: Jun. 12, 1992

[51] Int. Cl.⁵ ......................... B32B 29/00; B32B 3/12

[52] U.S. Cl. .................................... 428/154; 428/156; 428/171; 428/178

[58] Field of Search ................ 428/154, 156, 171, 178

[56] References Cited

U.S. PATENT DOCUMENTS

| | | | |
|---|---|---|---|
| D. 239,137 | 3/1976 | Appleman | D59/2A |
| 3,414,459 | 12/1968 | Wells | 161/131 |
| 3,547,723 | 12/1970 | Gresham | 156/209 |
| 3,556,907 | 1/1971 | Nystrand | 156/470 |
| 3,684,603 | 8/1972 | Iltis | 156/152 |
| 3,708,366 | 1/1973 | Donnelly | 156/209 |
| 3,738,905 | 6/1973 | Thomas | 161/127 |
| 3,867,225 | 2/1975 | Nystrand | 156/209 |
| 3,940,529 | 2/1976 | Hepford et al. | 428/178 |
| 3,961,119 | 6/1976 | Thomas | 428/178 |
| 4,116,594 | 9/1978 | Leanna et al. | 425/3 |
| 4,211,743 | 7/1980 | Nauta et al. | 264/284 |
| 4,320,162 | 3/1982 | Schulz | 428/154 |
| 4,325,773 | 4/1982 | Schulz | 156/471 |
| 4,483,728 | 11/1984 | Bauernfeind | 156/209 |
| 4,487,796 | 12/1984 | Lloyd et al. | 428/154 |
| 4,543,142 | 9/1985 | Kuepper et al. | 156/209 |
| 4,659,608 | 4/1987 | Schulz | 428/171 |
| 4,759,967 | 7/1988 | Bauernfeind | 428/154 |
| 4,921,034 | 5/1990 | Burgess et al. | 162/109 |
| 4,978,565 | 12/1990 | Pigneul et al. | 428/156 |

FOREIGN PATENT DOCUMENTS

0475671A2 3/1992 European Pat. Off. .

OTHER PUBLICATIONS

Related commonly assigned copending application filed on the same date as this application in the names of Kevin B. McNeil, Donald D. Culver, and James R. Johnson, and entitled Modular Construction Pattern Rolls for Use in Paper Converting and Paper Converted Thereby (copy enclosed).

*Primary Examiner*—P. C. Sluby

*Attorney, Agent, or Firm*—Larry L. Huston; Frederick H. Braun

[57] ABSTRACT

An embossed paper laminate having two laminae. The laminae are embossed so that each embossed site of one lamina is adhesively joined to the nonembossed region of the other lamina. The laminate is made by two close tolerance pattern rolls juxtaposed to form a nip. Each pattern roll has radially extending protuberances which contact the periphery of the other pattern roll intermediate its protuberances. The laminae are fed through the nip in face-to-face relationship and are embossed and adhesively joined to the other lamina by the radially extending protuberances.

5 Claims, 6 Drawing Sheets

DUAL PLY CELLULOSIC FIBROUS STRUCTURE LAMINATE

FIELD OF THE INVENTION

The present invention relates to embossed cellulosic fibrous structures, and to a process and apparatus for making such embossed cellulosic fibrous structures.

BACKGROUND OF THE INVENTION

Cellulosic fibrous structures are a staple of everyday life. Cellulosic fibrous structures are used as consumer products such as paper towels, toilet tissue, and facial tissue.

Multiple lamina cellulosic fibrous structures are very well known in the art of consumer products. Such products are cellulosic fibrous structures having more than one, typically two, laminae superimposed in face-to-face relationship to form a laminate. Frequently these laminae are embossed for aesthetic reasons, to maintain the laminae in face-to-face relation as the laminate is used by the consumer, or to provide spacing between the laminae.

During the embossing process, the laminae are fed through a nip formed between juxtaposed axially parallel rolls. Discrete protuberances on these rolls compress like regions of each lamina into engagement and contacting relationship with the opposing lamina. The compressed regions of the laminae provide an aesthetic pattern and provide for joining of and maintaining the laminae in face-to-face contacting relationship.

Embossing is typically performed by one of two processes, knob-to-knob embossing, wherein protuberances on axially parallel rolls juxtaposed to form a nip therebetween are registered with protuberances on the opposing roll, and nested embossing where the protuberances of one roll mesh between the protuberances of the other roll. Examples of knob-to-knob embossing and nested embossing are illustrated in the prior art by U.S. Pat. Nos. 3,414,459 issued Dec. 3, 1968 to Wells and commonly assigned; 3,547,723 issued Dec. 15, 1970 to Gresham; 3,556,907 issued Jan. 19, 1971 to Nystrand; 3,708,366 issued Jan. 2, 1973 to Donnelly; 3,738,905 issued Jun. 12, 1973 to Thomas; 3,867,225 issued Feb. 18, 1975 to Nystrand and 4,483,728 issued Nov. 20, 1984 to Bauernfeind. Commonly assigned U.S. Pat. Des. 239,137 is Mar. 9, 1976 to Appleman illustrates an emboss pattern found on commercially successful paper toweling.

The consumer presented with an embossed cellulosic fibrous structure as a consumer product typically desires the product to have a high quality cloth-like appearance, to have a relatively thick caliper and to have an aesthetically pleasing pattern. All of these attributes must be provided without sacrificing the consumer products' other desired qualities of softness, absorbency, and bond strength between the laminae.

Different attempts have been made in the art to improve upon the embossments caused by the embossing processes. For example, attempts have been made in the art to provide embossed patterns having different depths, and asymmetric embossments. In some of these attempts, the asymmetric embossments have different orientations on each lamina of the consumer product. Other attempts have been made in the art to provide embossments having a certain size and representing a particular surface area of the embossed sheet. Yet other attempts in the art teach a particular angle, relative to the machine direction of manufacture, for the embossments. Examples of such attempts are illustrated in U.S. Pat. Nos. 4,320,162 issued Mar. 16, 1982 to Schulz, et al.; 4,659,608 issued Apr. 21, 1987 to Schulz and 4,921,034 issued May 1, 1990 to Burgess et al.

Other attempts have been made in the art to provide embossments having crests and depressions which are joined in a particular configuration, or which provide patterns corresponding to the apparatus used to manufacture the cellulosic fibrous structure. At least one attempt in the art teaches a particular apparatus having meshed protuberances which come within a very short distance of the opposite roll. Yet this arrangement produces merely the nested embossments discussed above. Examples of such attempts in the art include U.S. Pat. Nos. 3,940,529 issued Feb. 24, 1976 to Hepford, et al., 4,325,773 issued Apr. 20, 1982 to Schulz, and 4,487,796 issued Dec. 11, 1984 to Lloyd et al.

Still other attempts in the art teach particular sizes of the protuberances and recesses on the roll used to form the embossed cellulosic fibrous structure. One example of such an attempt is illustrated in U.S. Pat. No. 3,961,119 issued Jun. 1, 1976 to Thomas.

It is apparent from the foregoing attempts, that the resulting cellulosic fibrous structures are still made according to one of the two known basic processes—either knob-to-knob embossing or nested embossing. However, the cellulosic fibrous structures made according to either process encounter certain drawbacks, discussed below, when the cellulosic fibrous structures are used as a consumer product such as paper towels, toilet tissue, or facial tissue.

What is needed in the art is a different type of embossing process which gives the cellulosic fibrous structure a thicker -caliper and a quilted cloth-like appearance, so that the consumer is presented with a consumer product which has the appearance of quality and yet does not allow the laminae to readily separate during use.

BRIEF SUMMARY OF THE INVENTION

The present invention comprises a cellulosic fiber structure having opposed outer faces and comprising two laminae. The laminae are joined in face-to-face relationship. Each lamina has an inner face oriented towards the other lamina and an outer face opposed thereto. Each of the two laminae comprises a nonembossed region and embossed sites projecting towards and adhesively joined to the other lamina at its nonembossed region.

The invention further comprises an apparatus for manufacturing such a cellulosic fiber structure and comprising two pattern rolls juxtaposed with parallel axes to form a nip therebetween. Each of the pattern rolls comprises a plurality of radially oriented protuberances projecting from its periphery. Each protuberance has a distal end which contacts the periphery of the other pattern roll.

The invention further comprises a process for producing such a cellulosic fibrous structure. The process comprises the steps of providing two pattern rolls having radially oriented protuberances extending therefrom and juxtaposed in an axially parallel relationship to form a nip therebetween. The distal ends of the protuberances of each roll contact the periphery of the other said roll. Two laminae are provided and forwarded through this nip in face-to-face relationship, whereby discrete embossed sites are formed by the protuberances. Adhesive is applied to each of the embossed sites. Each lamina is adhesively joined to the other at the embossed sites.

BRIEF DESCRIPTION OF THE DRAWINGS

While the Specification concludes with claims particularly pointing out and distinctly claiming the present invention, it is believed the same will be better understood by the following Specification taken in conjunction with the associated drawings in which like components are given the same reference numeral, and:

DETAILED DESCRIPTION OF THE INVENTION

The Cellulosic Fibrous Structure

Figure 1:
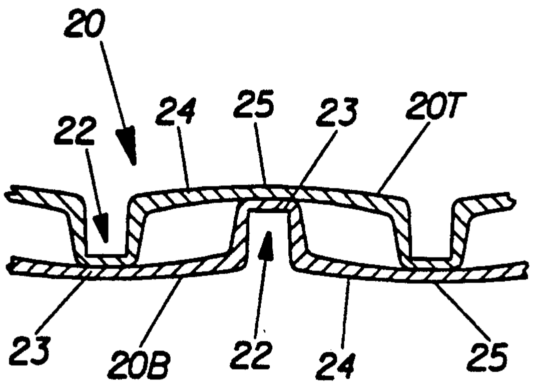
FIG. 1 is a fragmentary vertical sectional view of a cellulosic fibrous structure according to the present invention.

Referring to FIG. 1, one execution of the invention comprises a cellulosic fibrous structure 20. The cellulosic fibrous structure 20 according to the present invention comprises two laminae 20T and 20B in face-to-face relation. Each of the laminae 20T and 20B has two distinct zones, an essentially continuous nonembossed region 24, and discrete embossed sites 22 projecting generally outward therefrom and preferably orthogonal thereto. Each zone 22 and 24 of each lamina 20T or 20B is composed of fibers approximated by linear elements.

The fibers are components of the cellulosic fibrous structure 20 which have one relatively large dimension (along the longitudinal axis of the fiber) compared to the other two relatively very small dimensions (mutually perpendicular, and being both radial and perpendicular to the longitudinal axis of the fiber), so that linearity is approximated. While microscopic examination of the fibers may reveal two other dimensions which are small, compared to the principal dimension of the fibers, such other two small dimensions need not be substantially equivalent nor constant throughout the axial length of the fiber. It is only important that the fiber be able to bend about is axis, be able to bond to other fibers and be distributed by a liquid carrier or by air.

The fibers comprising the cellulosic fibrous structure 20 may be synthetic, such as polyolefin or polyester; are preferably cellulosic, such as cotton linters, rayon or bagasse; and more preferably are wood pulp, such as soft woods (gymnosperms or coniferous) or hard woods (angiosperms or deciduous). As used herein, a fibrous structure 20 is considered "cellulosic" if the fibrous structure 20 comprises at least about 50 weight percent or at least about 50 volume percent cellulosic fibers, including but not limited to those fibers listed above. A cellulosic mixture of wood pulp fibers comprising softwood fibers having a length of about 2.0 to about 4.5 millimeters and a diameter of about 25 to about 50 micrometers, and hardwood fibers having a length of less than about 1 millimeter and a diameter of about 12 to about 25 micrometers has been found to work well for the cellulosic fibrous structures 20 described herein.

If wood pulp fibers are selected for the cellulosic fibrous structure 20, the fibers may be produced by any pulping process including chemical processes, such as sulfite, sulphate and soda processes; and mechanical processes such as stone groundwood. Alternatively, the fibers may be produced by combinations of chemical and mechanical processes or may be recycled. The type, combination, and processing of the fibers used are not critical to the present invention. The hardwood and softwood fibers may be layered throughout the thickness of the cellulosic fibrous structure 20.

A cellulosic fibrous structure 20 according to the present invention is macroscopically two-dimensional and planar, although not necessarily flat. The cellulosic fibrous structure 20 does have some thickness in the third dimension. However, the third dimension is relatively small compared to the actual first two dimensions or to the capability to manufacture a cellulosic fibrous structure 20 having relatively large measurements in the first two dimensions.

The cellulosic fibrous structure 20 according to the present invention comprises a laminate of two individual laminae 20T and 20B. A "lamina" is taken off the forming element of the papermaking machine as a single sheet having a thickness prior to drying which does not change unless fibers are added to or removed from the sheet. Each lamina 20T or 20B is joined to the other lamina 20B or 20T. It is to be understood that each lamina 20T or 20B may be directly joined to the opposite lamina 20B or 20T, or, may be connected through an intermediate layer, if desired, interposed between the laminae 20T and 20B.

Each lamina 20T and 20B of the cellulosic fibrous structure 20 is joined to the other lamina 20B and 20T at the embossed sites 22. Particularly, the distal end 23 of each embossed site 22 projects towards and contacts the nonembossed region 24 of the opposite lamina 20T or 20B.

Adhesive is applied to the distal end 23 of each embossed site 22, so that each embossed site 22 is adhesively joined to the nonembossed region 24 of the opposite lamina 20T or 20B. This arrangement provides a cellulosic fibrous structure 20 having two laminae 20T and 20B, wherein each lamina 20T and 20B is joined to the opposing lamina 20T or 20B at each embossed site 22 to which adhesive has been applied to the distal end 23 thereof. This arrangement provides the advantage that the adhesive joining of the laminae 20T and 20B may occur in a pattern spaced as tightly as made practical by the equipment used in the manufacturing process. Alternatively, adhesive joining may occur at locations very sparsely distributed throughout the cellulosic fiber structure.

The cellulosic fibrous structure 20 may be thought of as having an imaginary centroid plane P—P which bisects the cellulosic fibrous structure between the outwardly oriented surfaces of the laminae 20T and 20B. The embossed sites 22 of each lamina 20T or 20B originate on the side of the imaginary centroid plane P—P of the respective lamina 20T or 20B and traverse the imaginary centroid plane P—P, so that the distal ends 23 of the laminae 20T and 20B are disposed on the opposite side of the imaginary centroid plane P—P.

Thus, the proximal and distal ends 23 of the embossed sites 22 are oppositely disposed, relative to the imaginary centroid plane P—P of a cellulosic fibrous structure 20 according to the present invention.

Furthermore, the cellulosic fibers at the distal ends 23 of the embossed sites 22 of both laminae 20T and 20B are compressed by the apparatus according to the present invention. Conversely, in cellulosic fibrous structures 20 made according to the nested and knob-to-knob embossing processes of the prior art and discussed below, the proximal and distal ends 23 of the embossed sites 22 lie on the same side of the imaginary centroid plane P—P. Also, the cellulosic fibers of the embossed sites 22 of only one lamina 20T or 20B are compressed against the nonembossed region 24 of the other lamina 20T or 20B in the nested embossing process according to the prior art.

Figure 2:
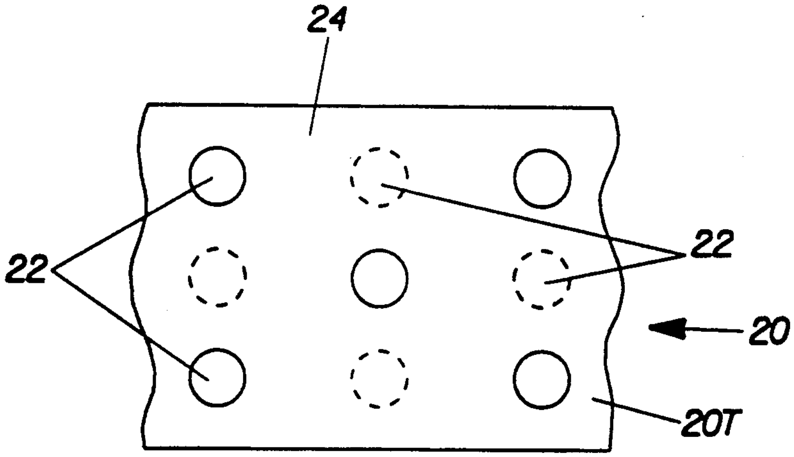
FIG. 2 is a fragmentary top plan view of the cellulosic fibrous structure of Figure I showing the embossed sites of the second lamina in phantom.

Referring to FIG. 2, the embossed sites 22 of the first lamina 20T are not registered with the embossed sites 22 of the second lamina 20B. This arrangement provides the advantage that an affirmative step is taken to adhere the embossed sites 22 of one lamina 20T or 20B to the nonembossed region 24 of the other lamina 20B or 20T. This arrangement provides the advantage, illustrated in FIG. 1, that the span of the nonembossed region 24 of one lamina 20T or 20B between embossed sites 22 is supported, approximately at its midpoint 25, by an embossed site 22 of the other lamina. Furthermore, the midpoint 25 of such span is stiffened by the adhesive present on the distal end 23 of the embossed site 22.

Of course, it will be recognized by one skilled in the art that the embossed sites 22 and nonembossed region 24 may be arranged in a pattern such that the embossed sites 22 do not intercept the midpoint 25 of the span of the nonembossed region 24 of the other lamina 20T or 20B. However, in such an arrangement, the distal end 23 of the embossed site 22 may still have adhesive applied thereto and adhesively join the two laminae 20T and 20B. Furthermore, an embossed site 22 not registered with the midpoint 25 of the span will still support the span of the nonembossed region 24 of the other lamina 20T or 20B.

The embossed sites 22 of each lamina 20T or 20B represent discrete regions of relatively high density, due to the compaction of the fibers which occurs during embossing. As used herein "embossing" refers to the process of deflecting a relatively small portion of a cellulosic fibrous structure 20 normal to its plane and impacting the projected portion of the cellulosic fibrous structure 20 against a relatively hard surface to permanently disrupt the fiber to fiber bonds. Embossing results in a permanent localized deformation of the embossed site 22 so deflected. The embossed sites 22 project normal to the plane of the cellulosic fibrous structure 20 and towards the opposite lamina 20T or 20B.

The embossed sites 22 of the cellulosic fibrous structure 20 are arranged in a nonrandom repeating pattern corresponding to the topography of the apparatus, discussed below, used to manufacture the cellulosic fibrous structure 20. Preferably the nonrandom repeating pattern tesselates, so that adjacent embossed sites 22 are cooperatively and advantageously juxtaposed. By being "nonrandom," the embossed sites 22 are considered to be in a predictable disposition and may occur as a result of known and predetermined features of the manufacturing process. As used herein, "repeating" means the pattern is formed more than once in the cellulosic fibrous structure 20. By being "discrete," the adjacent embossed sites 22 are not contiguous.

As used herein the "essentially continuous" nonembossed region 24 extends substantially throughout the fibrous structure in one or both of its principal directions. The essentially continuous nonembossed region 24 has a lesser density than the embossed sites 22, since the essentially continuous nonembossed region 24 is not compacted in the embossing process. The density of the essentially continuous nonembossed region 24 approximates the density of the discrete embossed sites 22 prior to being embossed.

If the cellulosic fibrous structure 20 illustrated in FIGS. 1 and 2 is to be used as a consumer product, such as a paper towel, a facial tissue, or a toilet tissue, the nonembossed region 24 of the cellulosic fibrous structure 20 is preferably essentially continuous in two orthogonal directions within the plane of the fibrous structure 20. It is not necessary that such orthogonal directions be parallel and perpendicular the edges of the finished product or be parallel and perpendicular the direction of manufacture of the product. It is only important that tensile strength be imparted to the cellulosic fibrous structure 20 in two orthogonal directions, so that any applied tensile loading may be more readily accommodated without premature failure of the product due to such tensile loading. Preferably, at least one continuous direction is parallel the direction of expected tensile loading of the finished product according to this execution of the present invention.

An example of an essentially continuous nonembossed region 24 is illustrated in FIG. 2. Other examples of cellulosic fibrous structures 20 having essentially continuous regions are disclosed in commonly assigned U.S. Pat. No. 4,637,859 issued Jan. 20, 1987, to Trokhan and incorporated herein by reference for the purpose of showing another cellulosic fibrous structure 20 having an essentially continuous region. Interruptions in the essentially continuous nonembossed region 24 are tolerable, but not preferred, so long as such interruptions do not substantially adversely affect the material properties of that zone of the cellulosic fibrous structure 20.

Of course, it is to be recognized if the cellulosic fibrous structure 20 is relatively large, as manufactured, and the embossed sites 22 are relatively small compared to the size of the fibrous structure 20 as manufactured, i.e., varying by several orders of magnitude, absolute predictability of the exact dispersion and patterns among the embossed sites 22 and the continuous nonembossed region 24 may be difficult, or even impossible, to ascertain and yet the pattern still be considered nonrandom.

Conversely, if the cellulosic fibrous structure 20 is relatively small and the embossed sites 22 are relatively large, as presented to the consumer, it may appear as though the pattern does not repeat, when in fact a repeating pattern is present in the larger scale cellulosic fibrous structure 20 as manufactured. It is only important that the embossed sites 22 and the essentially continuous nonembossed region 24 be dispersed in a pattern substantially as desired to yield the performance properties which render the cellulosic fibrous structure 20 suitable for its intended purpose.

It will be apparent to one skilled in the art there may be small transition regions having a density intermediate the density of the embossed sites 22 and the nonembossed region 24 and which circumscribe or border the embossed sites 22. Such transition regions are a normal and expected artifact of the manufacturing process and are not to be confused with either the embossed sites 22 or the nonembossed region 24.

Referring still to FIG. 2, the size of the pattern of the embossed sites 22 within the cellulosic fibrous structure 20 may vary from about 2 to about 11 embossed sites 22 per square centimeter (10 to 70 embossed sites 22 per square inch), and preferably from about 5 to about 8 embossed sites 22 per square centimeter (30 to 50 embossed sites 22 per square inch). The embossed sites 22 may be bilaterally staggered in a pattern having a principal axis 45 from the machine direction of manufacture, may be unilaterally staggered or may be registered in position with the adjacent embossed sites 22.

If desired, in an alternative embodiment, adhesive is only applied to the distal end 23 of selected embossed sites 22. This arrangement provides the advantage that a relatively softer cellulosic fibrous structure 20 may be formed while conserving materials.

With continuing reference to FIG. 2, the embossed sites 22 of the first lamina 20T are not in register with the embossed sites 22 of the second lamina 20B. This arrangement provides the advantage that an affirmative step is taken to adhere the embossed sites 22 of one lamina 20T or 20B to the nonembossed region 24 of the other lamina 20B or 20T.

Additionally, this arrangement provides the advantage, illustrated in FIG. 1, that the span of the nonembossed region 24 of one lamina 20T or 20B between embossed sites 22 is supported, approximately at its midpoint 25, by the embossed site 22 of the other lamina 20B or 20T. Furthermore, the midpoint 25 of such span is stiffened by the adhesive present on the distal end 23 of the embossed site 22.

Furthermore, the nonembossed region 24 is not compacted by the manufacturing process, as are the discrete embossed sites 22. This difference in compaction between these zones creates an aesthetically discernible pattern in the cellulosic fibrous structure 20. Particularly, the pattern creates a quilted, cloth-like appearance in the cellulosic fibrous structure 20, which appearance can be enhanced or minimized, as desired, by the process and apparatus described hereinbelow.

The Process and Apparatus

Figure 3:
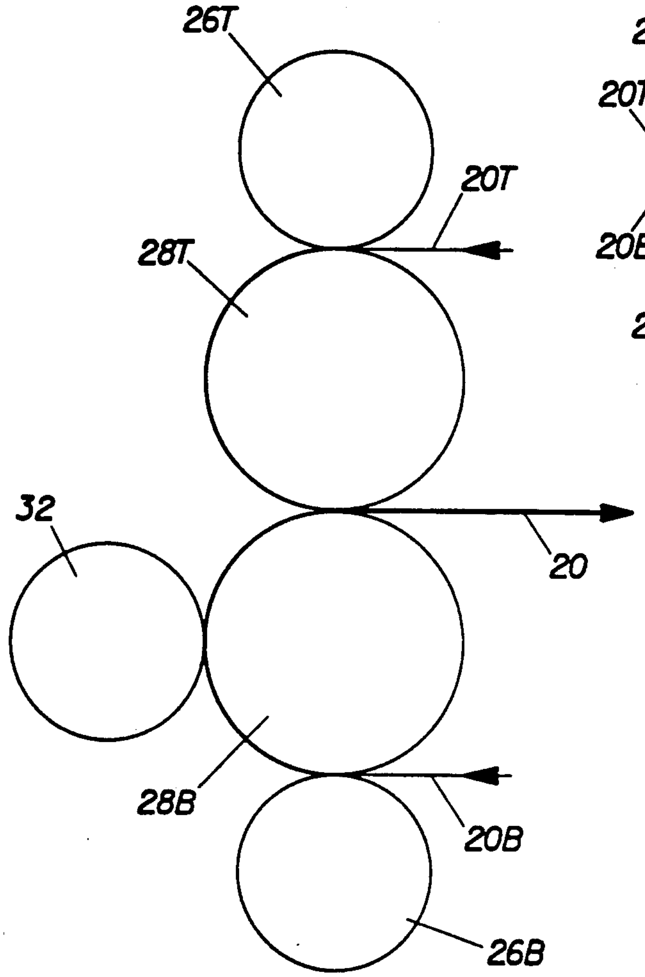
Fig. 3 PRIOR ART
FIG. 3 is a schematic side elevational view of an apparatus according to the prior art using a knob-to-knob embossing process.
Figure 3A:
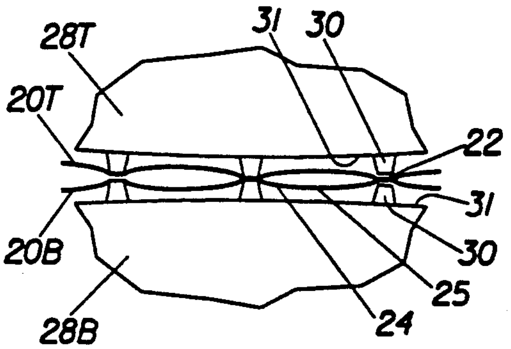
Fig. 3A PRIOR ART
FIG. 3A is an enlarged view of the nip between the pattern rolls of FIG. 3 and having a cellulosic fibrous structure in the nip.

Referring to FIGS. 3 and 3A, embossing according to the prior art was frequently performed by a process referred to as nested embossing. In nested embossing two laminae 20T and 20B are embossed between mated pressure rolls 26T and 26B and likewise noted pattern rolls 28T and 28B. The pressure rolls 26T and 26B and pattern rolls 28T and 28B are juxtaposed with parallel axes to form three nips, a first nip between the top pressure roll 26T and the top pattern roll 28T, a second nip between the bottom pressure roll 26B and the bottom pattern roll 28B, and a third nip between the top and bottom pattern rolls 28T and 28B.

The pattern rolls 28T and 28B have protuberances 30 which extend radially outwardly and contact the periphery 31 of the respective pressure rolls 26T or 26B at the respective nips. Each lamina 20T or 20B to be joined into the resulting cellulosic fibrous structure 20 is fed through one of the nips between the pattern rolls 28T or 28B and the respective pressure roll 26T or 26B. Each lamina 20T or 20B is embossed in the nip by the protuberances 30 of the respective pattern roll 28T or 28B.

After embossing, one of the laminae 20T or 20B has adhesive applied to the resulting embossed sites 22 by an adhesive applicator roll 32. The adhesive applicator roll 32 may be utilized in conjunction with either lamina 20T or 20B, providing the ply bonding roll 34 is disposed to compress this lamina 20T or 20B against the respective pattern roll 28T or 28B at the embossed sites 22. In this process, the embossed sites 22 are the only portion of the lamina 20T or 20B to which adhesive is applied, because the embossed sites 22 are the only portions of the lamina 20T or 20B which can contact the adhesive applicator roll 32. Thus, adhesive does not coat the entire surface of either lamina 20T or 20B, but only the embossed sites 22 of the lamina 20T or 20B used in conjunction with and contacting the adhesive applicator roll 32.

The laminae 20T and 20B, one lamina 20T or 20B having adhesive applied to the embossed sites 22, are then fed through the nip between the top and bottom pattern rolls 28T and 28B. In this nip, the laminae 20T and 20B are juxtaposed in face-to-face relationship, with the embossed sites 22 of each lamina 20T and 20B registered with the nonembossed region 24 of the other lamina 20B or 20T.

The two laminae 20T and 20B are then fed through a nip between the pattern roll 20B associated with the adhesive applicator roll 32 and a ply bonding roll 34, to insure the embossed sites 22 having the adhesive applied from the adhesive applicator roll 32 are securely in contact with and joined to the nonembossed region 24 of the opposing lamina 20T or 20B. The pattern roll 28B juxtaposed with the ply bonding roll 34 only makes contact with the lamina 20B at the embossed sites 22, due to the discrete protuberances 30 of the pattern roll 28B prevent its periphery 31 from touching the lamina 20B sufficient to cause compression of the lamina 20B.

Figure 4:
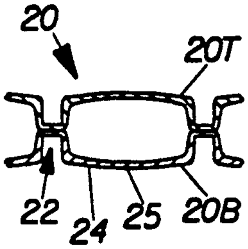
Fig. 4 PRIOR ART
FIG. 4 is a fragmentary vertical sectional view of a cellulosic fibrous structure according to the prior art made by the apparatus of FIG. 3.

Referring to FIG. 4, a cellulosic fibrous structure 20 made by the nested embossing process has the laminae 20T and 20B adhesively joined only at alternating embossed sites 22. This alternative adhesive pattern occurs because the intermediate embossed sites 22 are not adhesively coated. This arrangement reduces the bond strength between the laminae 20T and 20B relative to a cellulosic fibrous structure 20 according to the present invention, because not every embossed site 22 is adhesively joined to the other lamina 20T or 20B in the cellulosic fibrous structure 20 according to FIG. 4.

An apparent solution to the bond strength problem may be to use an adhesive applicator roll 32 in conjunction with both of the pattern rolls 28T and 28B. However, this apparent solution is infeasible, because contact between the pattern roll 28B or 28T and the ply bonding roll 34 only occurs at the protuberances 30 of the pattern roll 28T or 28B registered with the embossed sites 22 of that lamina 20B and the ply bonding roll 34. Contact which occurs at locations not registered with embossed sites 22 having adhesive on the distal ends 23 of the embossed sites 22 does not cause the adhesive to contact or to be joined to the other lamina 20T or 20B.

Another apparent solution is to utilize two smooth surfaced ply bonding rolls 34 to insure contact occurs throughout the entirety of the laminae 20T and 20B of the cellulosic fibrous structure 20. However, this apparent solution requires the additional expense of another ply bonding roll 34. But, even more significantly, a nip formed between two smooth surfaced rolls compresses the cellulosic fibrous structure 20 throughout its entirety, disrupts fiber to fiber bonds throughout, and results in a consumer product having generally lower caliper, lower tensile strength, but not the quilted appearance desired for higher quality and more aesthetically pleasing consumer products.

Figure 5:
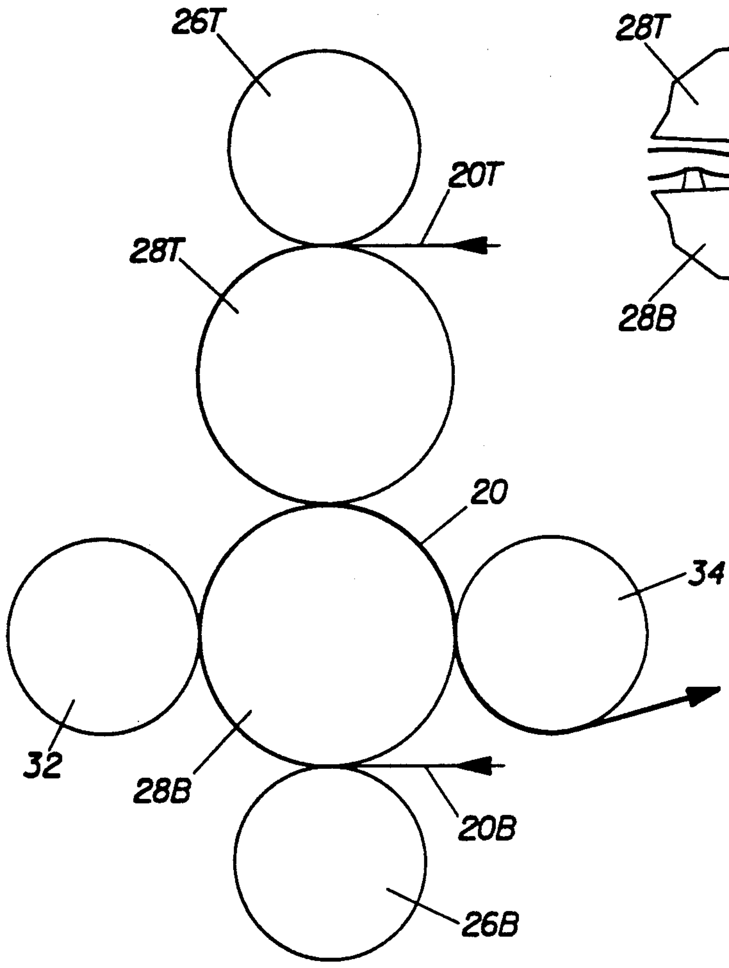
Fig.5 PRIOR ART
FIG. 5 is a schematic side elevational view of an apparatus according to the prior art using a nested embossing process.
Figure 5A:
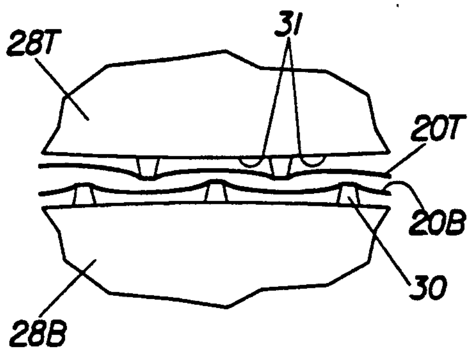
Fig.5A PRIOR ART
FIG. 5A is an enlarged view of the nip between the pattern rolls of FIG. 5 and having a cellulosic fibrous structure in the nip.

Referring to FIGS. 5 and 5A, one process known in the art to achieve adhesive joining at every embossed site 22 is knob-to-knob embossing. In knob-to-knob embossing, the protuberances 30 of each pattern roll 28T and 28B are registered with the protuberances 30 of the other pattern roll 28B or 28T. Thus, each protuberance 30 on one roll 28T or 28B contacts a protuberance 30 of the opposing roll 28B or 28T at the nip during each revolution.

Figure 6:
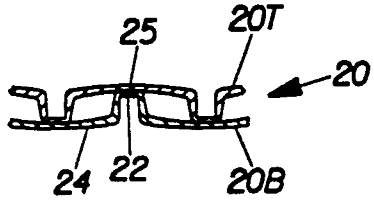
Fig.6 PRIOR ART
FIG. 6 is a fragmentary vertical sectional view of a cellulosic fibrous structure according to the prior art made by the apparatus of FIG. 5.

Referring to FIG. 6, a cellulosic fibrous structure 20 made by knob-to-knob embossing has a two sided depression at each embossed site 22. This two sided depression is caused by the compression from the registered protuberances 30. This arrangement produces a cellulosic fibrous structure 20, which typically loses caliper in the balance of the converting operation, because the cellulosic fibrous structure 20 does not have embossed sites 22 on one of the laminae 20T and 20B which are out of register with the embossed sites 22 on the other lamina 20B or 20T. Furthermore, the span between embossed sites 22 of the nonembossed region 24 does not have the support from the embossed sites 22 of the other lamina 20T or 20B. Such a cellulosic fibrous structure 20 may lose caliper during the balance of the converting operation or even in its package while awaiting purchase and use by the consumer.

Figure 7:
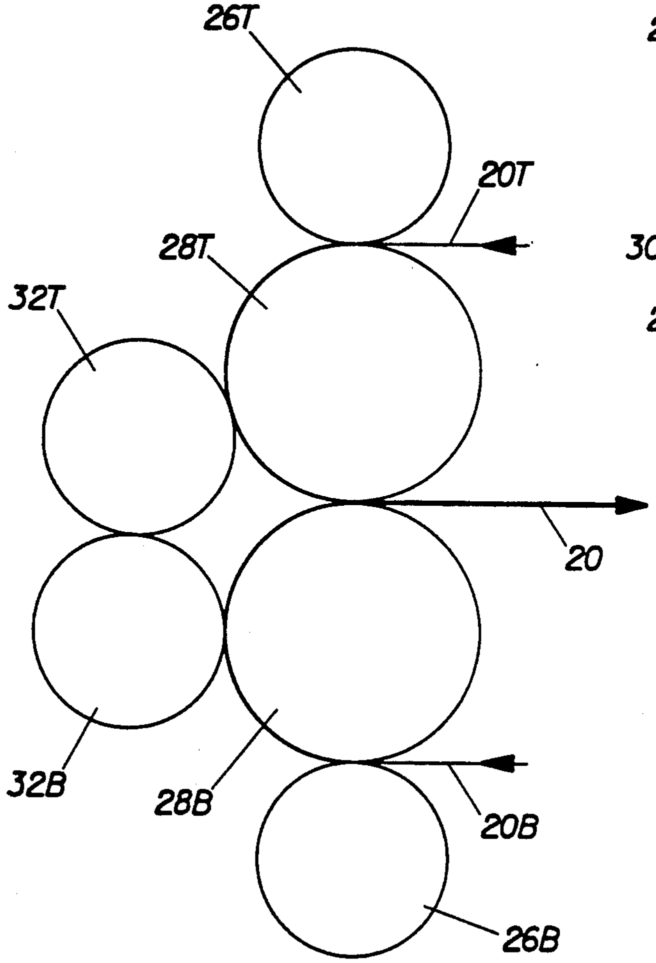
FIG. 7 is a schematic side elevational view of an apparatus used in an embossing process according to the present invention.
Figure 7A:
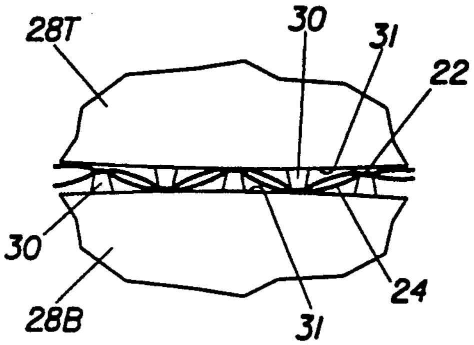
FIG. 7A is an enlarged view of the nip between the pattern rolls of FIG. 7 and having a cellulosic fibrous structure in the nip.

Referring to FIGS. 7 and 7A, in the embossing process according to the present invention, two pressure rolls 26T and 26B and two pattern rolls 28T and 28B are juxtaposed with parallel axes to form three nips, as described above relative to the embossing processes of the prior art. The protuberances 30 of each pattern roll 28T and 28B are not registered at the nip with the protuberances of the opposing pattern roll 28B or 28T, as occurs in the knob-to-knob embossing process. Instead, the protuberances 30 of each pattern roll 28B or 28T at the nip are intermediate the protuberances 30 of the other pattern roll 28T or 28B.

Figure 8:
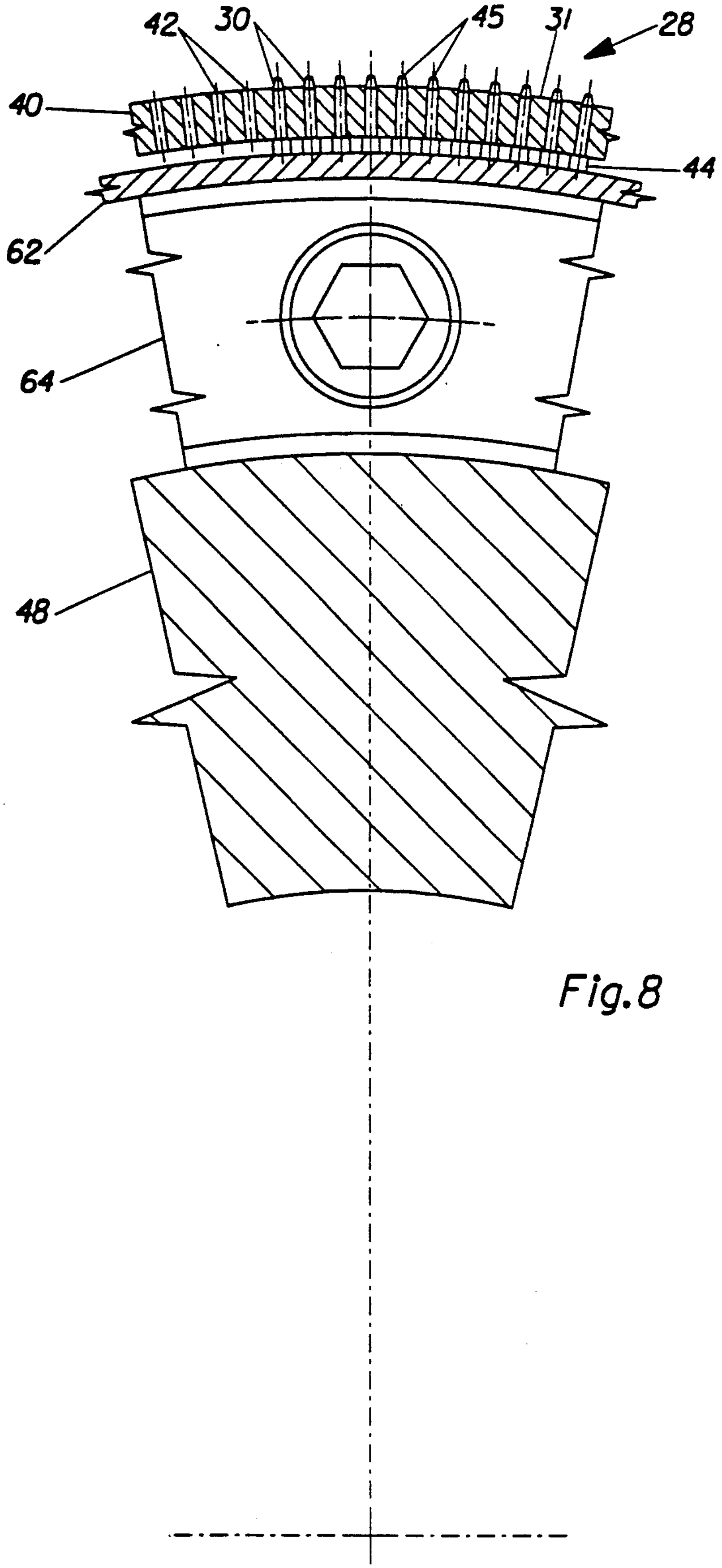
FIG. 8 is a fragmentary axial vertical sectional view of either of the pattern rolls of FIG. 7, showing a modular pattern roll having a base roll, inner shell, and locking assembly

Significantly, however, the distal end 45 of each protuberance 30, as illustrated in FIG. 8, contacts the periphery 31 of the other pattern roll 28T or 28B intermediate the proximal ends of the protuberances 30 of the other pattern roll 28B or 28T. This arrangement requires not only that each protuberance 30 radially extend the same distance from the periphery of its respective pattern roll 28T or 28B, but also that the periphery 31 of the pattern rolls 28T or 28B at the proximal ends of the protuberances 30 be straight and of constant diameter.

In this arrangement, an embossed site 22 is formed between the top pattern roll 28T and the top pressure roll 26T at each protuberance 30 on the top pattern roll 28T. Likewise, an embossed site 22 is formed between the bottom pattern roll 28B and the bottom pressure roll 26B at each protuberance 30 on the bottom pattern roll 28B.

In this arrangement, each lamina 20T or 20B is joined to the other lamina 20B or 20T at the nip between the two pattern rolls 28T and 28B. The protuberances 30 of each pattern roll 28B or 28T deflect the distal ends 23 of the respective embossed sites 22 to the midpoint 25 of the span of the nonembossed region 24 of the other lamina 20T or 20B. In the finished product, each embossed site 22 is adhesively joined to the other lamina 20T or 20B at this midpoint 25, by the interposition of the laminae 20T and 20B between the protuberances 30 of the pattern rolls 28T and 28B and the periphery 31 of the proximal ends of the protuberances of the other pattern roll 28T or 28B.

After the embossed sites 22 are formed between the pattern roll 28T or 28B and the pressure roll 26T or 26B, the embossed sites 22 of each lamina 20T or 20B are coated with adhesive from the respective adhesive applicator rolls 32T and 32B. Only the embossed sites 22 which extend radially outwardly beyond the nonembossed region 24 of the laminae 20T and 20B are adhesive coated, because these are the only areas of the laminae 20T and 20B which contact the adhesive applicator rolls 32T and 32B. Adhesive joining between the laminae 20T and 20B occurs at each embossed site 22, because the application of the adhesive and the compression of that lamina 20T or 20B against the other lamina 20B or 20T occurs coincident with the application of the adhesive—at the embossed sites 22.

If desired, one of the adhesive applicator rolls 32T or 32B may be omitted, providing for adhesive to be present on the embossed sites 22 originating from only one of the laminae 22T or 22B. Alternatively, either adhesive applicator roll 32T or 32B may be configured to apply adhesive to only selected embossed sites 22 of the respective lamina 20T or 20B of FIG. 1. The resulting cellulosic fibrous structure 20 has both embossed sites 22 which are adhesively joined to both laminae 20T and 20B and embossed sites 22 which are not adhesively joined to the other lamina 20T or 20B.

In the process according to the present invention, it is desired the adhesive joining of the laminae 20T and 20B occurs while the embossed site 22 is at the maximum deformation across the imaginary centroid plane P—P. By adhesively locking the laminae 20T and 20B into place coincident the maximum deformation of the embossed sites 22, a more quilted appearance and feel is created in the nonembossed region 24 intermediate the embossed sites 22.

Referring to FIG. 8, a pattern roll 28T or 28B according to the present invention may be made with a modular construction having various components rather than as an integral structure. The modular pattern roll 28T or 28B may comprise a cylindrically perforate shell 40 having a first plurality of holes 42 therethrough. The modular pattern roll 28T or 28B is provided with a second plurality of protuberances 30 which may, but does not necessarily, equal the first plurality of holes 42.

Each protuberance 30 is inserted through a hole 42 in the cylindrically perforate shell 40 and secured in place by a means for maintaining the protuberances 30 and the cylindrically perforate shell 40 in fixed relationship. This means for maintaining the protuberances 30 and the cylindrically perforate shell 40 in fixed relationship prevents the protuberances 30 from moving radially inward relative to the cylindrically perforate shell 40 or skewing from the radial direction.

Figure 9:
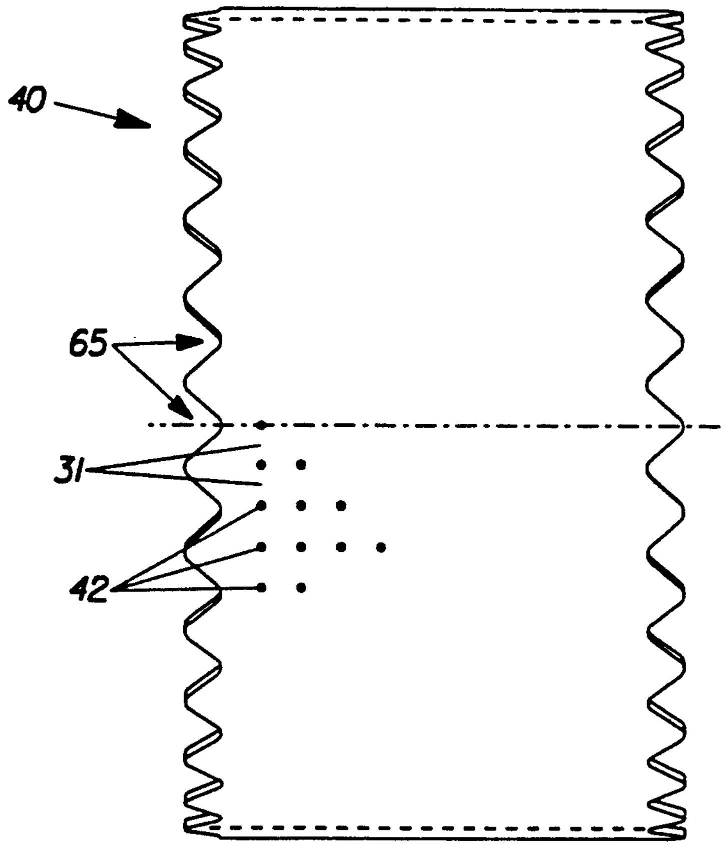
FIG. 9 is a vertical profile view of a cylindrically perforate shell utilized for the pattern roll of FIG. 8.

Referring to FIG. 9, the cylindrically perforate shell 40 may be made of any outside diameter desired, with a preferred diameter being about 40 to about 50 centimeters (16 to 20 inches). The cylindrically perforate shell 40 has a radial thickness sufficient to withstand the stresses imposed by the embossing process described herein, and is preferably at least about 0.5 to about 1.0 centimeters (0.2 to 0.4 inches) in thickness. For the embodiment described herein the cylindrically perforate shell 40 may have an outside diameter of about 45.36 centimeters (17.860 inches) and an inside diameter of about 43.79 centimeters (17.240 inches). The cylindrically perforate shell 40 may be made of carbon or nickel alloy steel and machined to a concentric, straight, constant diameter periphery 31 by means and equipment which are well known in the art and will not be described herein.

If desired, either the inside circumference or the outside periphery 31 of the cylindrically perforate shell 40 may be plated, coated, or otherwise finished as desired for purposes of hygiene, minimizing the attraction of foreign materials to the resulting pattern rolls 28T or 28B, or to reduce corrosion.

The cylindrically perforate shell 40 is open on at least one end, so that an axially oriented through-hole is present, making the cylindrically perforate shell 40 hollow. Additionally, the cylindrically perforate shell 40 is provided with a plurality of radially oriented holes 42. The radially oriented holes 42 are disposed in a pattern and location corresponding to the pattern and location desired for the embossed sites 22 of the resulting cellulosic fibrous structure 20.

The holes 42 in the cylindrically perforate shell 40 of FIG. 9 may be of any size and shape desired, with the understanding that the shape of the holes 42 will influence the size and shape of the protuberances 30 used therewith. The holes 42 in the cylindrically perforate shell 40 may be aligned in the machine and cross machine directions, unilaterally staggered, bilaterally staggered, or arranged in any pattern as desired to facilitate adhesive joining and the bond strength necessary for the consumer product during use.

The disposition, size, and shape of the holes 42 are not critical, it is only important that each hole 42 in the cylindrically perforate shell 40 be radially oriented and properly spaced from the adjacent holes 42. It is also not necessary that each hole 42 be equally spaced from the adjacent holes 42, but only that the pattern of the holes 42 be known and repeatable, so that proper registration between the two pattern rolls 28T and 28B made according to this invention can be reliably achieved.

For the embodiment described herein, the holes 42 and protuberances 30 may be disposed on a pattern oriented 45 degrees from the machine direction and bilaterally offset from the next protuberance about 2.23 millimeters (0.0876 inches) in both the machine direction and cross machine direction. The holes 42 in the cylindrically perforate shell 40 may be round, having a diameter of about 2.11 millimeters (0.082 inches) for the embodiment described herein.

Referring back to FIG. 10, the protuberances 30 used in conjunction with the modular pattern rolls 28T and 28B for the present invention are made from a single piece of steel through hardened to a hardness of at least Rockwell C 55 and preferably at least Rockwell C 60. At the base of each protuberance 30 is an annular shoulder 44 which at least partially circumscribes the protuberance 30. Alloy steel such as 4340 or 52100 is suitable. If desired, the protuberances 30 may be made of a lower grade of steel and case hardened, although this process makes dimensional control more difficult. The shank of the protuberance 30 tapers intermediate the annular shoulder 44 and the distal end 45 of the protuberance 30 at an included angle of about 26 degrees, measured from an imaginary apex beyond the distal end 45 of the protuberance 30.

The protuberances 30 should be sized in accordance with the holes 42 in the cylindrically perforate shell 40. During assembly, the protuberances 30 are inserted through the holes 42 in the cylindrically perforate shell 40 from the inside of the cylindrically perforate shell 40, so that the distal ends 45 of the protuberances 30 extend radially outwardly from the cylindrically perforate shell 40 and the shoulder 44 of the protuberance 30 contacts and is in engaged relationship with the inside circumference of the cylindrically perforate shell 40.

Figure 10:
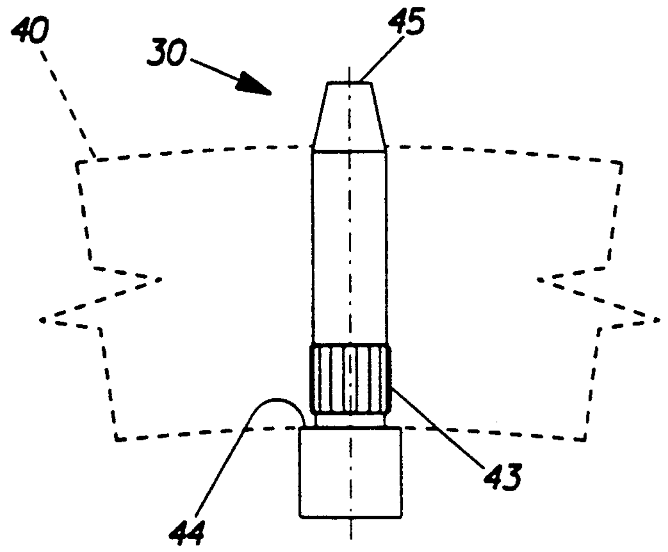
FIG. 10 is a vertical profile view of the protuberances shown in position in a fragmentary cross section of the cylindrically perforate shell of FIG. 9 to make the modular pattern roll of FIG. 8.

The shoulder 44 should be sized large enough so that the protuberance 30 cannot pass through the holes 42 of the cylindrically perforate shell 40 in the radially outward direction and become a missile hazard during operation. The shoulder 44 should be at least about 0.5 millimeters (0.02 inches) greater than the diameter of the holes 42 in the cylindrically perforate shell 40 and have a thickness of at least about 2.5 millimeters (0.10 inches) to prevent the protuberances 30 from being extruded through the holes and creating such a missile hazard. As illustrated in FIG. 10, the protuberances 30 may be provided with knurls 43 to prevent the protuberance 30 from rotating about on its own axis. The shank of the protuberances 30 may have an interference fit at the knurls 43 of about 0.03 millimeters (0.001 inches). This interference fit temporarily holds the protuberances 30 in place while the means for maintaining the protuberances 30 and cylindrically perforate shell 40 in fixed relationship are installed and assembly of the pattern roll 28T or 28B is completed. If desired, the protuberances 30 may be permanently held in place by a press fit and the annular shoulder 44 omitted.

For the embodiments described herein, to be used with paper toweling having two laminae 20T and 20B and a basis weight as presented to the consumer of about 0.04 kilograms per square meter (26 pounds per 3,000 square feet) and each lamina having a caliper prior to embossing of about 0.3 millimeters (0.012 inches), the protuberances 30 should have an axial length, which extends radially beyond the periphery 31 of the cylindrically perforate shell 40, of at least about 1.3 millimeters (0.050 inches) preferably at least about 1.8 millimeters (0.070 inches), and more preferably about 2.0 millimeters (0.080 inches), but not more than about 2.5 millimeters (0.100 inches).

It is understood that slight adjustment from the foregoing dimensions may be necessary to accommodate a cellulosic fibrous structure 20 of greater or lesser basis weight and caliper. However, with slight adjustments, the apparatus described herein can be used to manufacture a cellulosic fibrous structure 20 having a basis weight of about 0.01 to about 0.07 kilograms per square meter (8 to 40 pounds per 3,000 square feet), and more preferably about 0.04 to about 0.05 kilograms per square meter (25 to 30 pounds per 3,000 square feet).

Protuberances 30 of this size help to insure sufficient deflection of the cellulosic fibrous structure 20 occurs at the embossed sites 22 and that a difference is apparent in the elevation between the embossed sites 22 and the nonembossed region 24 of the laminae 20T and 20B. This arrangement yields a cellulosic fibrous structure 20 as illustrated in FIG. 1 having caliper of at least about 1.0 millimeters (0.040 inches) under a confining pressure of about 14.7 grams per square centimeter (95 grams per square inch) and a depth between the midpoint 25 of the span between embossed sites 22 and the embossed sites 22 of at least about 1 millimeter (0.04 inches) measured with a surface contact profilometer under no measurable confining pressure.

Generally as caliper increases due to greater embossing, the tensile strength of the cellulosic fibrous structure 20 decreases. This phenomenon can be mitigated, however, by heating the pattern rolls 28, as is well known in the art.

The distal ends 45 of the protuberances 30 may have an area of about 0.01 square centimeters (0.002 square inches) with the understanding that it will produce embossed sites 22 having a like area. For the embodiments described herein, the protuberances 30 and distal ends 45 thereof may be circular in cross section and round respectively. However, it is understood that protuberances 30 of other cross sections and distal ends 45 which are not circular may be advantageously used with the present invention.

As illustrated in FIG. 8, after the protuberances 30 are inserted through the holes 42 in the cylindrically perforate shell 40, a means for maintaining the protuberances 30 and the cylindrically perforate shell 40 in fixed relationship must be provided. The means for maintaining the protuberances 30 and the cylindrically perforate shell 40 in fixed relationship prevents the protuberances 30 from moving radially inwardly under the compressive forces present in and during the manufacturing process and which forces are caused by the compression of the distal end 45 of the protuberance 30 against the periphery 31 of the other pattern roll 28T or 28B at the proximal end of the protuberances 30 of that pattern roll 28T or 28B.

One preferred means for maintaining the protuberances 30 in the cylindrically perforate shell 40 in fixed relationship is a radial anvil. As used herein a "radial anvil" refers to any structure or fixture which transmits the radial forces through the protuberances 30 to the mounting for the pattern roll 28T or 28B. As is well known in the art, the pattern roll 28T or 28B may be mounted on both ends of its shaft, may be cantilevered, may be trunnion mounted, and provided with journals, bearings, or other means to allow the pattern roll 28T or 28B to axially rotate while maintaining the desired axially parallel relationship, position, and clearance with the other pattern roll 28B or 28T.

As illustrated in FIG. 8, one advantageous execution of a radial anvil which provides a satisfactory means for maintaining the cylindrically perforate shell 40 and protuberances 30 in fixed relationship comprises a central base roll 48, and an inner shell 62. The base roll 48 and inner shell 62 both are mutually concentric and each have a constant inner diameter, a constant outer diameter, and a constant radial thickness.

Examining the assembly of the foregoing components in more detail, the inner shell 62, for the embodiment described herein, may be made having an outside diameter of about 43.34 centimeters (17.063 inches) and an inside diameter of about 42.50 centimeters (16.734 inches). The proximal ends or shoulders 44, if provided, of the protuberances 30 define a circle having a smaller diameter, particularly a diameter of about 43.33 centimeters (17.060 inches), and therefore an interference fit is present.

To overcome this interference fit caused by the difference in size between the inner shell 62 and the circle defined by the insides of the protuberances 30 and to aid in assembling the inner shell 62 to the pattern roll 28T or 28B, the inner shell 62 is thermally contracted. Cooling the inner shell 62 reduces its diameter, due to the associated thermal contraction. For the embodiments described herein a temperature differential of at least about 77° C. (170° F.) has been found suitable.

After the inner shell 62 is cooled it is inserted into the subassembly comprising the protuberances 30 and the cylindrically perforate shell 40. The inner shell 62 is allowed to warm up to ambient temperature and a press fit of about 0.08 millimeters (0.003 inches) is formed. This press fit maintains the protuberances 30 in fixed relationship relative to the internal shell for the balance of the assembly of the pattern rolls 28T and 28B.

However, this arrangement does not yet adequately transmit forces radially applied to the protuberances 30 to the mounting for the pattern rolls 28T and 28B. The constant diameters and thickness base roll 48 and inner shell 62 must be joined to one another by a component.

One suitable component to join the base roll 48 and inner shell 62 and transmit the radial load therebetween is an annular collar. A simple annular collar may be of constant internal and external diameter and constant radial thickness. The annular collar may be sized to provide an interference fit between the base roll 48 and the inner shell 62, and may be axially inserted therebetween using a hydraulic press as is well known in the art.

A particularly preferred annular is radially adjustable in thickness. While many annular collars may be suitable and used in the art, one component which is radially adjustable and has been used with success is an internal locking assembly 64. An internal locking assembly 64 may be inserted into the annular space between the base roll 48 and the inner shell 62 in a loose condition, then tightened using the axially oriented threaded fasteners commonly supplied and associated with such internal locking assemblies to radially expand the internal locking assembly 64.

The locking assembly 64 should be sufficiently sized to transmit the torque from the drive unit through the base roll 48 or whatever component of the pattern roll 28T or 28B which is connected to the drive unit, to the inner shell 62 and eventually to the cylindrically perforate shell 40 without inimical angular deflection therebetween. A self-centering internal locking assembly 64 has been found advantageous, as it is important that concentricity be maintained in the modular pattern rolls 28T and 28B. A Series 303 size 340×425 self-centering internal locking assembly 64 sold by the Ringfeder Company of Westwood, N.J., has been found suitable for the embodiments described herein.

A less preferred means (not shown) for maintaining the protuberances 30 and the cylindrically perforate shell 40 in fixed relationship is a hardenable resin which fills the inside of the cylindrically perforate shell 40. The resin may be poured, in liquid form into a vertically disposed cylindrically perforate shell 40 having the protuberances installed from the inside, and allowed to harden. Once hardened, the resin solidifies and prevents the protuberances 30 from moving radially inwardly, or from rotating about its axis.

Suitable resins include epoxy type polymers. A particularly suitable resin is sold by Conap of Olean, N.Y. under the model number TE-1257, and used with EA-116 hardener.

If this means for maintaining the cylindrically perforate shell 40 and protuberances 30 in a fixed relationship is selected, the pattern roll 28T or 28B may be provided with a base roll 48, so that the amount of resin necessary to hold the protuberances 30 and cylindrically perforate shell 40 in fixed relationship is minimized. A hollow or solid cylindrical base roll 48 having a diameter slightly less than that defined by the proximal ends of the protuberances 30 may be installed and centered in the cylindrically perforate shell 40 after the protuberances are installed.

The resin is poured in the annular space between the base roll 48 and the cylindrically perforate shell 40. This arrangement provides the advantages of reducing the total amount of resin used, which frequently has a lower modulus in compression than either the base roll 48 or the cylindrically perforate shell 40, and provides for economization of manufacture and may reduce the sensitivity of the cure time to factors affecting the hardness of the resin after curing.

It is understood that one disadvantage to this means is the protuberances 30 may embed in the resin, reducing their radial protrusion from the periphery 31 of the pattern roll 28T or 28B. This embedment can be accommodated by adjusting the pattern rolls 28T and 28B to be closer together or may be compensated for by longer protuberances 30.

Another less preferred means for maintaining the cylindrically perforate shell 40 and the protuberances 30 in fixed relationship is the base roll 48 used to fill the cylindrically perforate shell 40 having the protuberances 30 installed through the holes 42 from the inside of the cylindrically perforate shell 40 used without resin. In this arrangement, the outside diameter of the base roll 48 is slightly larger than the inside diameter defined by the proximal ends of the protuberances 30. A press fit or interference fit arrangement then occurs, so that the proximal ends of the protuberances 30 impart radially compressive stresses to the base roll 48.

An interference fit may be advantageously accomplished through thermal contraction of the base roll 48. However, one disadvantage of this arrangement is that disassembly and reuse of the individual components of the pattern roll 28T or 28B is typically difficult to accomplish. Thus, for example, if one of the protuberances 30 were broken, it may be infeasible to replace just the broken protuberances 30 (a problem indigenous to the integral pattern rolls of the prior art), and the pattern roll 28T or 28B may have to be scrapped. The base roll 48 is cooled, axially inserted in the cylindrically perforate shell 40 and warmed to ambient temperatures so that exposure to the final dimension may occur.

If desired, the axial ends of the cylindrically perforate shell 40 may be provided with a means for registering 65 the cylindrically perforate shell 40 with other cylindrically perforate shells 40 juxtaposed in axially contiguous relationship therewith. The means for registering 65 the cylindrically perforate shells 40 of axially juxtaposed and contiguous pattern rolls 28T or 28B provides for continuity of the aesthetic pattern formed by the protuberances 30 across the consumer product.

This arrangement allows a plurality of pattern rolls 28T or 28B to be axially concatenated, so that in manufacture a cellulosic fibrous structure 20 of greater width can be advantageously constructed. Particularly, this contributes to more economical manufacture of such a cellulosic fibrous structure 20.

One suitable means for registering 65 the cylindrically perforate shell 40 of a pattern roll 28T or 28B to another cylindrically perforate shell 40 of an axially contiguous pattern roll 28T or 28B is irregularities in the axial ends of the cylindrically perforate shell 40.

Particularly, the axial ends of the cylindricall perforate shell 40 may be provided with scallops as illustrated, may be serrated or provided with a saw-tooth or square wave pattern. The exact size, shape, distribution, and position of the irregularities will depend upon the particular aesthetic pattern of the protuberances 30.

If desired, other patterns may be made in the pattern rolls 28T and 28B which will conform to like patterns of embossed sites 22 and nonembossed regions 24 in the cellulosic fibrous structure 20. For example, instead of discrete embossed sites 22 and an essentially continuous nonembossed region 24, the pattern rolls 28T and 28B may be provided with an essentially continuous protuberance network.

Prophetically this essentially continuous protuberance network may be provided by having a cylindrical shell of the proper radial wall thickness, and drilling blind holes into the outside of the cylindrical shell. The blind holes will not compress the coincident regions of the respective lamina 20T or 20B against the other lamina 20B or 20T in the nip formed by the pattern rolls 28T and 28B. This arrangement produces a cellulosic fibrous structure 20 having an essentially continuous embossed site 22 and discrete nonembossed site.

It will be apparent that there are many other variations within the scope and intent of the claimed invention, all of which are covered by the appended claims.

What is claimed is:

1. A cellulosic fibrous structure having opposed outer faces, said cellulosic fibrous structure comprising two laminae joined in face-to-face relationship, each of said laminae having an inner face oriented towards said opposite lamina and an opposed outer face oriented away from the center of said cellulosic fibrous structure, each said lamina comprising a nonembossed region and embossed sites oriented towards, compressed against and adhesively joined to the other said lamina at its nonembossed region.

2. A cellulosic fibrous structure according to claim 1 wherein said embossed sites of each said laminae are discrete and separated from the adjacent embossed sites of each of said laminae.

3. A cellulosic fibrous structure according to claim 2 wherein said nonembossed region forms an essentially continuous network.

4. A cellulosic fibrous structure according to claim 3 wherein said embossed sites have a depth of at least about 1 millimeter, from the midpoint of the span of the nonembossed regions between adjacent bond sites.

5. A cellulosic fibrous structure having two laminae joined in face-to-face relationship, said cellulosic fibrous structure comprising:

a first lamina having a nonembossed region and embossed sites projecting generally outward therefrom;

a second lamina having a nonembossed region and embossed sites projecting generally outward therefrom, whereby said embossed sites of at least one said lamina are joined to said nonembossed region of said other lamina, wherein a plurality of said embossed sites of each lamina are joined to said other lamina at a distal end which has been compressed; and an imaginary centroid plane intermediate said laminae and bisecting the space between said nonembossed regions, whereby embossed sites from each said lamina traverse said centroid plane.

* * * * *

UNITED STATES PATENT AND TRADEMARK OFFICE
CERTIFICATE OF CORRECTION

PATENT NO. : 5,294,475

DATED : MARCH 15, 1994

INVENTOR(S) : Kevin B. McNeil

It is certified that error appears in the above-identified patent and that said Letters Patent is hereby corrected as shown below:

| | |
|---|---|
| Column 3, line 16 | delete "Figure I" and insert therefor --Figure 1--. |
| Column 7, line 39 | delete "45" and insert therefor --45°--. |
| Column 16, line 26 | delete "cylindricall" and insert therefor --cylindrically--. |

Signed and Sealed this

First Day of November, 1994

*Attest:*

Bruce Lehman

BRUCE LEHMAN

*Attesting Officer*

*Commissioner of Patents and Trademarks*

UNITED STATES PATENT AND TRADEMARK OFFICE
CERTIFICATE OF CORRECTION

PATENT NO. : 5,294,475

DATED : MARCH 15, 1994

INVENTOR(S) : KEVIN B. MCNEIL

It is certified that error appears in the above-identified patent and that said Letters Patent is hereby corrected as shown below:

| | |
|---|---|
| Column 8, line 5 | delete "FIGS. 3 and 3A" and insert therefor --FIGS. 5 and 5A--. |
| Column 8, line 63 | delete "FIG. 4" and insert therefor --FIG. 6--. |
| Column 9, line 31 | delete "FIGS. 5 and 5A" and insert therefor --FIGS. 3 and 3A--. |
| Column 9, line 40 | delete "FIG. 6" and insert therefor --FIG. 4--. |

Signed and Sealed this

Twenty-eight Day of March, 1995

*Attest:*

BRUCE LEHMAN

*Attesting Officer*

*Commissioner of Patents and Trademarks*